(No Model.) 7 Sheets—Sheet 3.

Z. P. HOTCHKISS.
AUTOMATIC TELEGRAPH TRANSMITTER.

No. 386,129. Patented July 17, 1888.

Witnesses:
Chas. J. Williamson.
Henry C. Hazard.

Inventor:
Zerry P. Hotchkiss.
by Prindle and Russell
Attorneys.

(No Model.) 7 Sheets—Sheet 4.

Z. P. HOTCHKISS.
AUTOMATIC TELEGRAPH TRANSMITTER.

No. 386,129. Patented July 17, 1888.

*Fig. 5.*

Witnesses:
Chas J Williamson,
Henry C. Hazard

Inventor:
Zeroy P. Hotchkiss.
By Prindle and Russell
Attorneys.

(No Model.) 7 Sheets—Sheet 5.

Z. P. HOTCHKISS.
AUTOMATIC TELEGRAPH TRANSMITTER.

No. 386,129. Patented July 17, 1888.

Fig. 6.

(No Model.) 7 Sheets—Sheet 6.

Z. P. HOTCHKISS.
AUTOMATIC TELEGRAPH TRANSMITTER.

No. 386,129. Patented July 17, 1888.

Witnesses:
Chas. J. Williamson
Henry C. Hazard

Inventor:
Zeroy P. Hotchkiss.
by Prindle and Russell
attorneys.

(No Model.) 7 Sheets—Sheet 7.

Z. P. HOTCHKISS.
AUTOMATIC TELEGRAPH TRANSMITTER.

No. 386,129. Patented July 17, 1888.

Witnesses:
Chas. J. Williamson,
Henry C. Hazard.

Inventor:
Zeroy P. Hotchkiss,
by Prindle & Russell
Attorneys.

United States Patent Office.

ZEROY P. HOTCHKISS, OF OAK PARK, ILLINOIS, ASSIGNOR OF ONE-HALF TO WILLIAM W. DUDLEY, OF WASHINGTON, DISTRICT OF COLUMBIA, AND CARLOS J. WARD, OF OAK PARK, ILLINOIS.

AUTOMATIC TELEGRAPH-TRANSMITTER.

SPECIFICATION forming part of Letters Patent No. 386,129, dated July 17, 1888.

Application filed August 10, 1885. Renewed October 21, 1887. Serial No. 253,013. (No model.)

*To all whom it may concern:*

Be it known that I, ZEROY P. HOTCHKISS, of Oak Park, in the county of Cook, and in the State of Illinois, have invented certain new and useful Improvements in Automatic Telegraphic Transmitters; and I do hereby declare that the following is a full, clear, and exact description thereof, reference being had to the accompanying drawings, in which—

Letters of like name and kind refer to like parts in each of the figures.

The object of my invention is to provide an improved automatic telegraphic transmitter; and to this end my invention consists in the construction, arrangement, and combination of parts, as hereinafter described, and more specifically pointed out in the claims.

In the drawings, A designates the casing of the apparatus, consisting of the main rectangular portion with closed sides A' A', back $A^2$, and top $A^3$. The front $A^4$ is provided with a hinged portion, $A^5$, hinged at its upper edge, forming a door for allowing access to the contained mechanism. This door is preferably, as shown, provided with a suitable lock at $a$, by which it can be secured when shut. The lower portion of the front $A^4$ is cut away to admit the passage of the series of operating key-levers, to be described.

Inclosing the space in front of the box occupied by the key-levers is the rectangular forwardly-extending low frame $A^6$, attached to the box or casing. The bottom of the casing can of course be closed, if desired, but I prefer to have it open, the casing being, if desired, fastened upon a suitable table.

At B B are shown the binding-posts for connecting the apparatus properly with the line-wires.

Extending across the casing, below the lower edge of the front of the casing at and near the opening made by cutting away the lower portion of such front, are the eight parallel rods C C C, preferably about three quarters of an inch apart in the size of apparatus which I use. Upon each of these rods are pivoted five of the key-levers D D D, each of which has an extension or lug, $d$, extending down from its lower edge, provided with the journal hole or opening receiving the respective pivot-rod C. These levers I make of sheet brass or metal. There are forty of them—one for each letter of the alphabet, one for the conjunction, and one for the sign of a paragraph, one each for a comma and period, and one for each of the unit figures of numbers, from one to nine, inclusive, and one for the cipher. Each lever is at its outer or forward end extended upward, as shown, and on the top of this extension is the finger-plate D', preferably rectangular in shape. These plates appear in eight transverse rows of five each. Those of the first row, or that nearest the casing-front, are marked with the letters from A to E, inclusive. The levers to which these plates are attached are the first, ninth, seventeenth, twenty-fifth, and thirty-third of the series, and are pivoted upon the forward or inner one of the rods C C. The finger-plates of the next row or transverse series are lettered from F to J, inclusive, and their levers are the second, tenth, eighteenth, twenty-sixth, and thirty-fourth of the series, and are pivoted upon the second one of the rods C C. This arrangement of the plates and key-levers is, as shown, carried on throughout the rest of the bank of plates, said plates being marked consecutively with the letters of the alphabet, the sign of and, the sign of a paragraph, comma, and period, figures from one to nine, inclusive, and a cipher, the last being on the plate at the extreme outer right-hand corner of the bank of plates. As the levers are, as described, formed of sheet brass or metal, the finger-plates D' D' can easily be formed by properly bending over a portion of the plate of which the lever is composed. For instance, the A-lever, with its plate, could be formed by first cutting or stamping out the lever from sheet-brass, with an arm or extension projecting upward from its upper edge at its outer end. The upper portion of this arm or extension could then be bent over to the right at a right angle.

To keep the lever-shanks from contact and from consequent interfering with each other, I place between them the metal strips $d'$ $d'$, through which pass the eight pivot-rods C C.

The upper edge of the inner arm of each of the levers D D is formed or provided with projections $d^2$ $d^2$, corresponding with the Morse character or sign for the letter, number, or mark of that particular lever. The dot of the Morse alphabet is represented by a projection taking up a very small portion of the length of the lever edge, while the dash is represented by a projection or raised portion extending over more of the edge of the lever.

The space between the dots or dashes of the Morse character is represented by the space between the projections on the lever, and its length by the extent of such space. For instance, the A-lever has upon it a small or narrow projection for the dot, and a projection of greater extent to represent the dash, the Morse character for A being - —. On the J-lever the projections would be formed and arranged to correspond with the Morse character for that letter, viz: — - — -.

Figure 1:
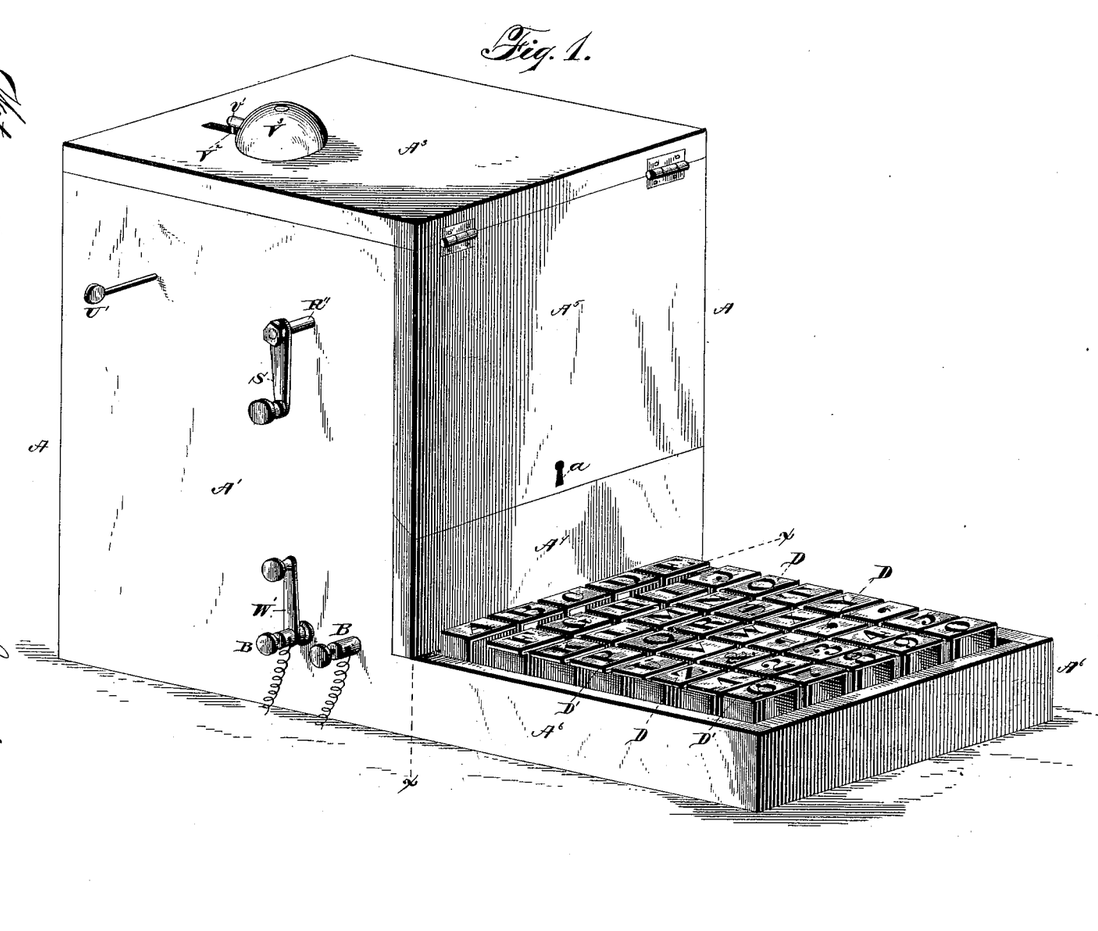
Figure 1 shows a perspective view of my apparatus as it appears when cased up ready for use.
Figure 2:
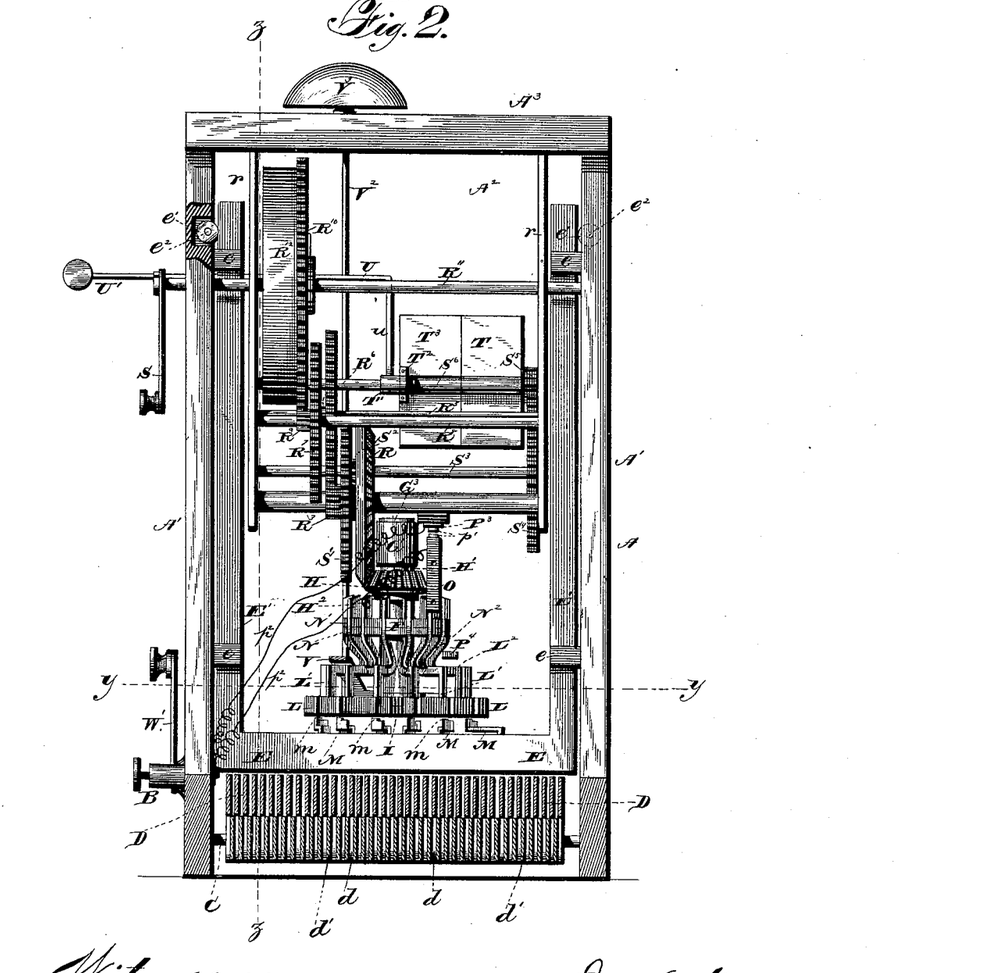
Fig. 2, a view, in front elevation, of my apparatus, the front of the casing being removed, and the key-levers being in vertical section on line $x\,x$ of Fig. 1.
Figure 3:
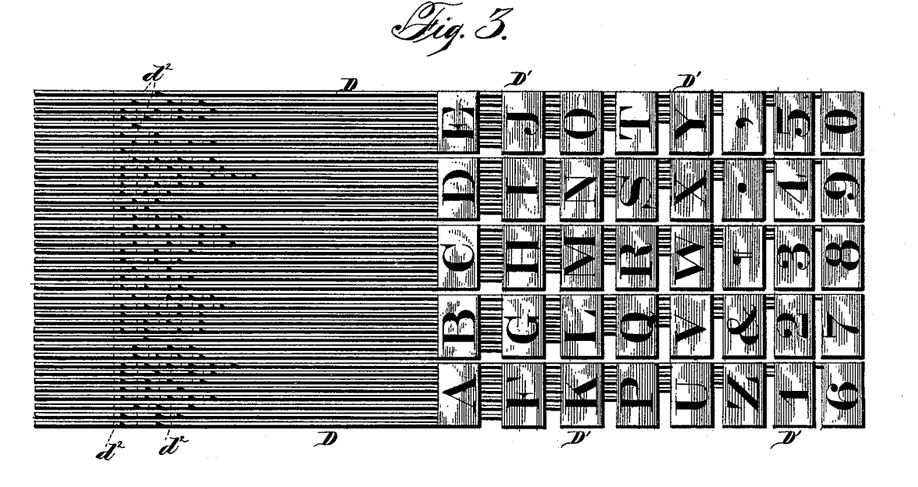
Fig. 3, a plan view of the key-levers, showing the arrangement of the projections thereon for engaging the unit-strips.

The series of projections on each lever begin at or near the farther or inner end of the lever, and run toward the pivotal portion of the lever. The rear or outer sides of the first projections on the levers, whether of the dot or dash kind, are preferably in line with each other, as shown best in Fig. 3.

Above the key-levers and extending horizontally across within the casing, at right angles to the levers, are the thirteen parallel flat unit-strips E E, turned up on their edges, as shown. At their ends these strips are provided with upwardly-extending arms E' E', guided vertically between guide-lugs $e$ $e$ on the sides of the casing. These guides, besides guiding the strip-arms, serve also to keep the different strips at certain fixed distances apart while allowing of their free up and-down movement. To diminish friction and enable the strips to rise easily and fall quickly, I provide the series of anti-friction rollers $e'$ $e'$ at each side of the casing, so arranged that corresponding and opposite rollers shall engage the opposite arms of the same strips. These rollers are journaled on rods $e^2$ $e^2$, attached to the casing-sides in any desired way. As these rollers engage the opposite arms of the unit-strips at points exactly opposite, the strips themselves must obviously be always horizontal, or at right angles to the casing-sides in their up-and-down movements, and one end of a strip cannot be raised or lowered more than the other end. The rollers can be kept at the proper distances apart by means of washers on the rods, or by portions of the casing projecting in between the rollers. These unit-strips are of a thickness equal to the extent of the upper end of one of the dot projections on the key-levers, and the inner or first strip is so situated as to be engaged squarely and raised by the first projection on any of the levers, as such lever is raised. A short dash projection on any of the levers is adapted to engage and raise two contiguous strips at a time.

For convenience sake in the matter of description, I shall refer to the unit-strips by number, beginning at the farther or inner strip and counting toward the front of the series. As indicated hereinbefore, each lever is to have an arrangement of dot and dash projections and spaces between the same corresponding with the Morse character for the letter, sign, mark, or figure on the finger-plate of such lever. For clearness sake the letters and marks on the plates of the levers are given herewith, with the Morse characters opposite the same, and numbers indicating which of the unit-strips are engaged and raised by the projections of the respective levers.

| | | |
|---|---|---|
| A - — | | 1, 3, 4 |
| B — - - - | | 1, 2, 4, 6, 8 |
| C - - - | | 1, 3, 6 |
| D — - - | | 1, 2, 4, 6 |
| E - | | 1 |
| F - — - | | 1, 3, 4, 6 |
| G — — - | | 1, 2, 4, 5, 7 |
| H - - - - | | 1, 3, 5, 7 |
| I - - | | 1, 3 |
| J - — - — - | | 1, 2, 4, 6, 7, 9 |
| K — - — | | 1, 2, 4, 6, 7 |
| L — — | | 1, 2, 3 |
| M — — | | 1, 2, 4, 5 |
| N — - | | 1, 2, 4 |
| O - - | | 1, 4 |
| P - — - — - | | 1, 3, 5, 7, 9 |
| Q - - — - | | 1, 3, 5, 6, 8 |
| R - - - | | 1, 4, 6 |
| S - - - | | 1, 3, 5 |
| T — | | 1, 2 |
| U - - — | | 1, 3, 5, 6 |
| V - - - — | | 1, 3, 5, 7, 8 |
| W - — — | | 1, 3, 4, 6, 7 |
| X - - - - | | 1, 3, 4, 6, 8 |
| Y - - - - | | 1, 3, 6, 8 |
| Z - - - - | | 1, 3, 5, 8 |
| & - - - - | | 1, 4, 6, 8 |
| ¶ — — — — | | 1, 2, 4, 5, 7, 8, 10, 11 |
| Period - — - — - - | | 1, 3, 5, 6, 8, 9, 11, 13 |
| Comma - — - — | | 1, 3, 4, 6, 8, 9 |

| | |
|---|---|
| 1 — — - | 1, 3, 4, 6, 7, 9 |
| 2 — — - - | 1, 3, 5, 6, 8, 9, 11, 13 |
| 3 — — - - | 1, 3, 5, 7, 8, 10 |
| 4 — — - - | 1, 3, 5, 7, 9, 10 |
| 5 — — — | 1, 2, 4, 5, 7, 8 |
| 6 — — - - | 1, 3, 5, 7, 9, 11 |
| 7 — — - - | 1, 2, 4, 5, 7, 9 |
| 8 — — - - | 1, 2, 4, 6, 8, 10 |
| 9 — - — | 1, 2, 4, 6, 8, 9 |
| 0 — — — | 1, 2, 3, 4 |

Centrally above the series of unit-strips and revolving on a vertical axis is the circuit-wheel F. The shaft G of this wheel is journaled in the vertical bearing G' on the bracket-arm G², attached to and extending forward from the rear side of the casing. On the upper end of the shaft is the collar or head G³, resting upon the upper end of a bearing, G', so as to support the shaft longitudinally while allowing it to rotate. On the shaft below this bearing is fixed a bevel-pinion, H, to be driven as hereinafter described. Between this pinion and the lower end of the bearing is a washer, H'. On the shaft below and engaging the lower side of the pinion I have shown a rigid collar, H². On the lower end of the shaft is the annular flange I, which has cut in its edge fourteen equidistant radial slots, $i\ i$, extending inward. The upper face of this flange is grooved on both sides of each slot, substantially at right angles to the slot. In the drawings I have shown the grooves $i'\ i'$ connected together, so as to form an annular groove concentric with the flange.

A cap, K, having fourteen radial slots, $k\ k$, milled in its edge to correspond in size and position with the slots in the flange, and also correspondingly grooved on its lower face, is placed and fastened upon the flange. Pins $k'\ k'$, placed in the grooves in the flange and extending across the slots therein, will then be held firmly in place in the grooves by the cap-plate. Said cap is preferably made in two parts, as shown, which can easily be put in place around the shaft F and fastened by screws $k^2\ k^2$, passing down through the collar $k^3$ on the shaft into the cap. If desired, the collar $k^3$ can be dispensed with and the screws can pass through the cap and into the flange. On the pins $k'\ k'$ are pivoted the inner ends of the radial arms or bars L L, provided near their outer ends with arms L' L', projecting up at right angles from arms L L and inward at right angles at their upper ends. These inturned portions $L^2\ L^2$ preferably have their inner ends cut at an angle inclined downward and inward, as shown.

Figure 4:
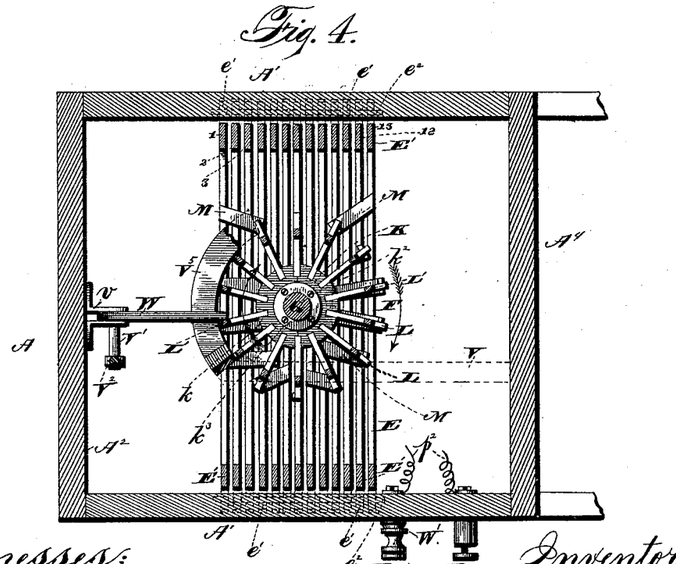
Fig. 4, a horizontal sectional view on line $y\,y$ of Fig. 2.
Figure 5:
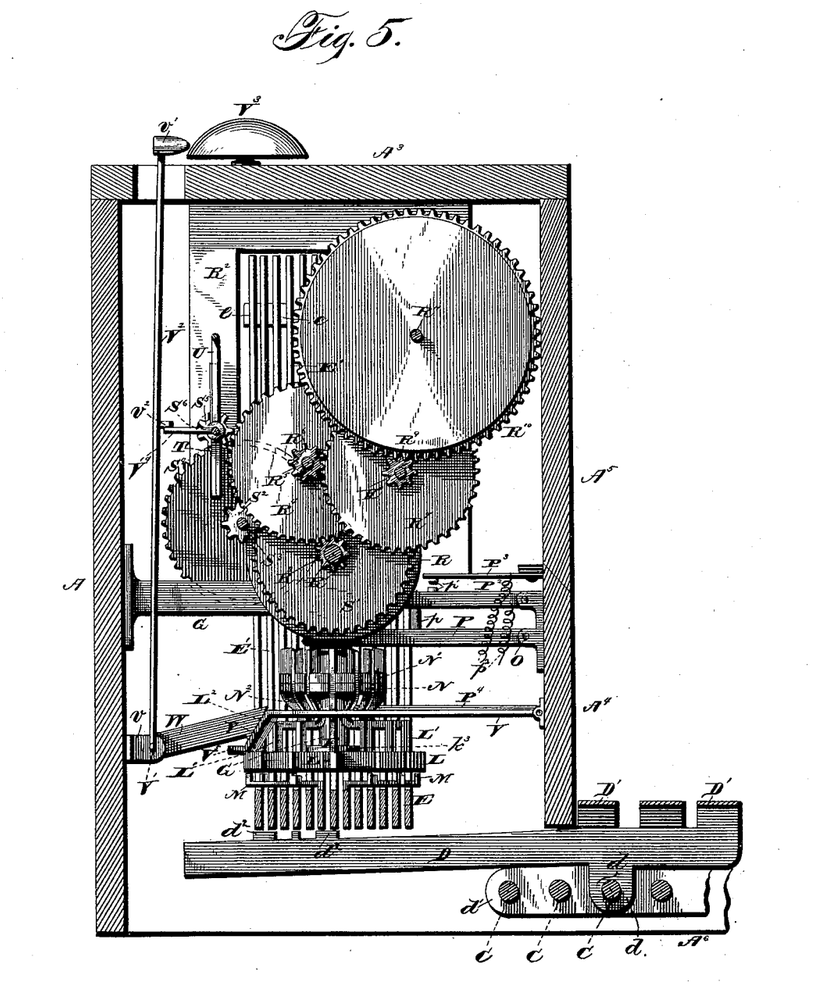
Fig. 5, a vertical sectional view of the apparatus on line $z\,z$ of Fig. 2.
Figure 6:
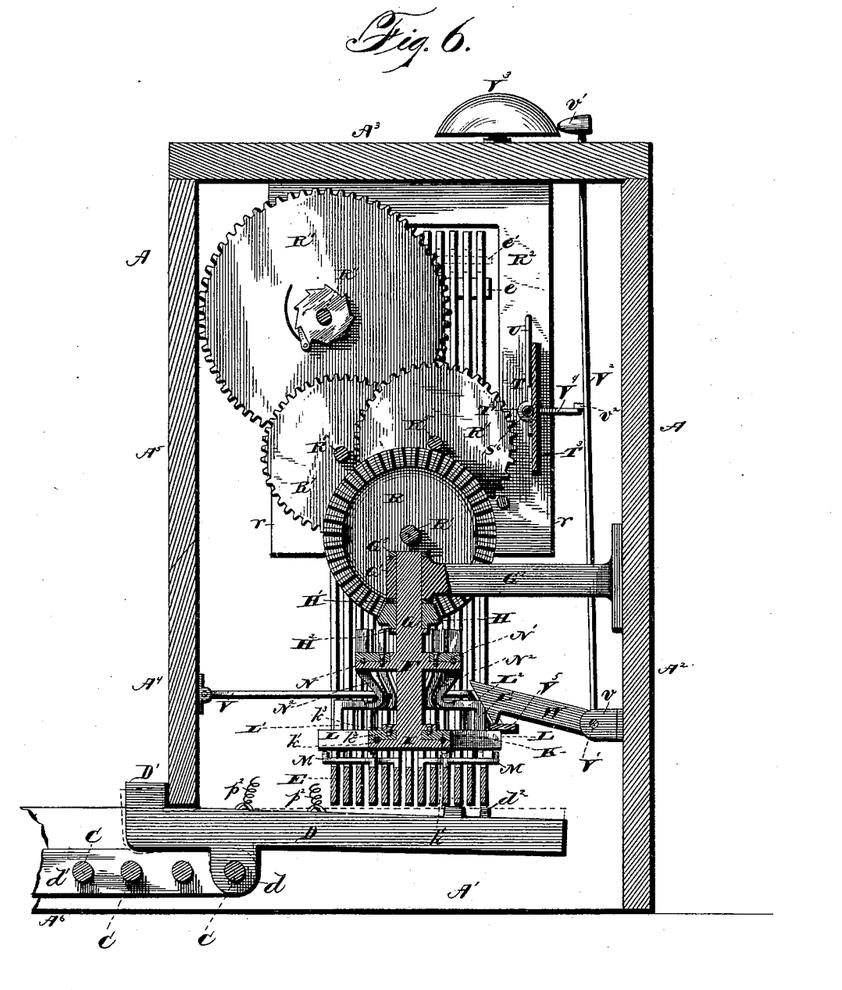
Fig. 6, a vertical sectional view of the apparatus in a plane from front to rear, passing through the axis of the circuit-wheel, all the key-levers being removed except the A-lever, which is shown in dotted lines as raised.
Figure 8:
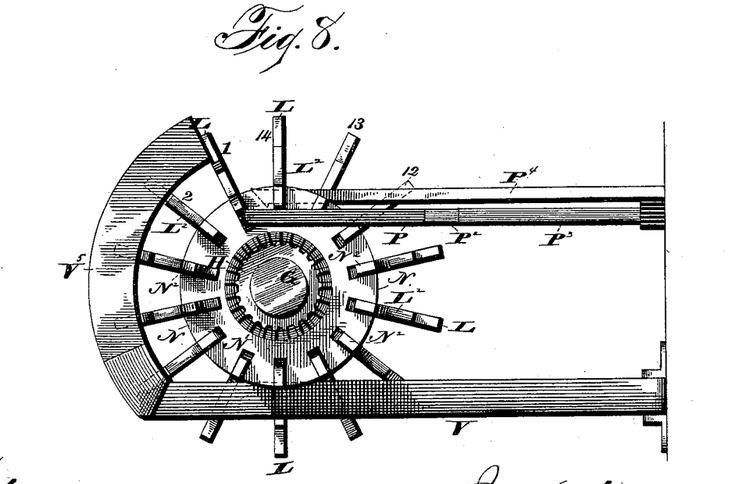
Fig. 8, a plan view of the circuit-wheel and the contact devices.
Figure 9:
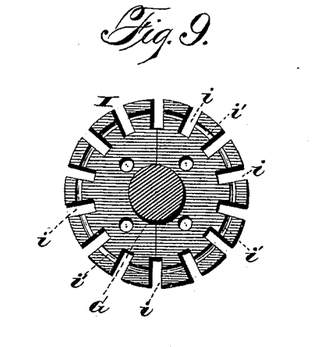
Fig. 9, a detail plan view of the lower head of the circuit-wheel with the annular cap and the pivoted arms removed.
Figure 10:
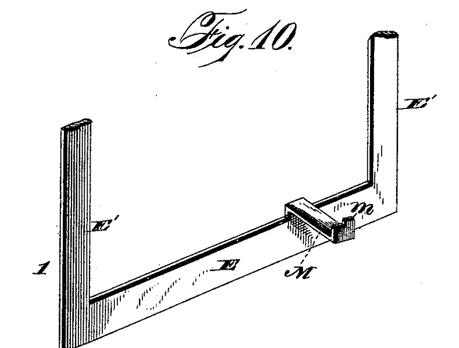
Fig. 10, a detail perspective view of one of the unit-strips.
Figure 11:
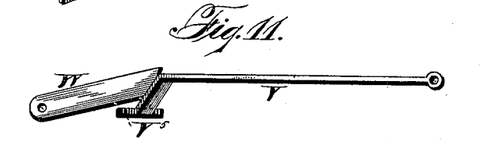
Fig. 11, a detail view, in elevation, of the pivoted stop-arm of the starting and stopping lever.
Figure 12:
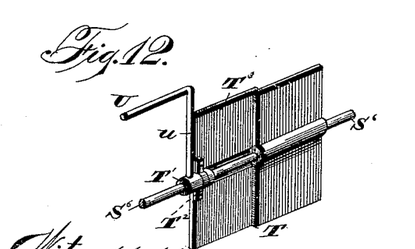
Fig. 12, a detail perspective view of the speed-regulator, and Fig. 13 a detail sectional view of the adjustable part thereof.
Figure 13:
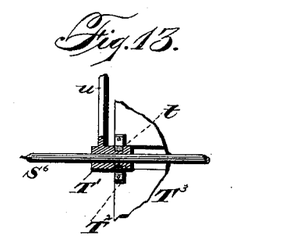

The arms L L, I term the unit-arms. Each of the unit-strips E E is, as shown, provided on its upper edge with an arm, M, adapted to engage the outer end of one of these pivoted unit arms or bars and raise it as the strip is raised. One of these bars or arms, as the fourteenth in Figs. 4 and 8, is idle and not in position to be operated by any of the lugs or arms on the unit-strips. From unit strip 1 the arm extends inward and forward to a point under the unit-arm next to the 14 arm, which I number 1, and then turns upward. Its extreme upper end is provided with a shoulder or projection, $m$, adapted to engage the side of the unit-arm when the strip is raised to elevate the arm, and so prevent the arm from moving in the direction of the arrow in Fig. 4. By this means the circuit-wheel will be kept from revolving until the unit strip is dropped again. Each of the other unit-strips has a similar engaging-arm adapted to raise and act in connection with its respective unit bar or arm in precisely the same way as that described.

On the shaft F, above flange I, is a second similar flange, N, of less diameter than the other. The cap N' of this flange is like that of the other, but is shown as fastened thereon by means of screws passing down directly into the flange. Within the slots of this flange and cap and on the pins extending across the slots are pivoted the swinging hooks or pawls N² N², having the hooks on their lower portions extending outward, as shown. The ends of these hooks are adapted to rest against the inner ends of the inturned upper portions, $L^2$ $L^2$, of the arms on the unit-bars L L. The pawls or hooks are so pivoted that their lower ends tend to swing outward as soon as disengaged by the respective arms on the unit bars. With this construction, if any one of the unit-bars be swung up to raise the upper portion, $L^2$, of its arm L', above the pawl or hook end, said pawl or hook will swing under such portion and hold it up, so that the bar will be kept elevated. By this movement of the pawl of course its upper end swings inward beyond the circle of the other pawls.

Pivoted at O to a bracket on the rear side of the front of the casing and extending rearward horizontally therefrom is the transmitting-lever P, whose inner end is situated beside the shaft of the circuit-wheel, and on its under side is provided with a lug or projection, P', situated within the circuit of the upper ends of the pawls N N, when the pawls are in their normal positions with their lower ends swung inward, as described hereinbefore, but in the track of the upper ends of any of the pawls whose lower ends have been allowed to swing outward, as described. The lug is beveled, so that as the circuit-wheel revolves and one of the pawl ends strikes it the transmitting-lever P will be thrown upward easily and quickly. This lever is so pivoted that it cannot fall below, but is supported in its proper normal position. Similarly pivoted to the casing above lever P is another lever, P², of conducting material, provided with a pin or stud, $p$, of non-conducting material, adapted to be engaged by lever P. Above lever P² is the transmitting-spring P³, of conducting material. Both the lever P² and spring P³ are preferably provided with platinum contact-points $p'\ p'$, which, when both levers P and P² are down in normal positions, do not touch each other; but when lever P² is raised by the upward movement of lever P, as its lug or projection P' is struck and thrown up by the engagement of one of the pawl ends, come into contact.

The lever P² is connected by wire $p^2$ with one of the binding-posts, and the spring P³ by wire $p^3$ with the other, so that the circuit will be made and broken again as the lever P² is swung upward and allowed to fall back to its normal position.

From the front side of the casing an arm, P⁴, extends rearward alongside of the circuit-wheel, on the same side of the shaft thereof as the lever P, to a point just beyond the fourteenth unit-bar, and between it and the first bar, as numbered in the drawings. The end of this arm on the side toward the circuit-wheel is beveled or inclined, so as to engage, as the circuit-wheel revolves, any pawl which may be swung out, as described above, at a point below its pivot and cause it to swing inward again to drop the engaged unit-bar and carry the upper end of the pawl to its normal outward position. This tripping of each raised pawl takes place just after the upper end of the pawl has engaged the projection P' on lever P to make the contact and close the circuit, as described.

Meshing with and adapted to drive the bevel-pinion H is the bevel gear-wheel R on shaft R', journaled at each end in the frame R², formed of plates or boards $r\, r$, dependent from the top of the casing, or fastened to the front or rear side, and extending inward parallel to the sides of the casing at a sufficient distance therefrom to allow of the free movement of the vertical arms on the unit-strips. On this shaft is also the pinion R³, meshing with and driven by gear-wheel R⁴ on shaft R⁵. On the latter shaft is the pinion R⁶, meshing with wheel R⁷ on shaft R⁸, on which is also the pinion R⁹, meshing with and driven by wheel R¹⁰ on shaft R¹¹ and driven from the spring R¹² in the ordinary and well-known way. The shaft R¹¹ passes entirely across the space within the casing in front of the series of upright arms of the unit-strips. A crank-arm, S, is provided on the outside of the casing, by which the spring can be wound up to drive the gearing in the usual and well-known way.

To regulate the speed at which pinion H and the circuit-wheel will be driven by the gearing, there is a gear-wheel, S', on the same shaft with the main bevel gear-wheel R, which meshes with pinion S² on shaft S³, and on the latter shaft is a gear-wheel, S⁴, meshing with pinion S⁵ on the fly-shaft S⁶, provided with the usual form of fly or regulating fan, T, consisting of a thin plate fastened to and projecting radially beyond opposite sides of the shaft. To make the resisting or retarding power of this fan adjustable, I provide on the shaft S⁶ the sliding sleeve T', grooved annularly at $t$. To a bearing, T², fitting this groove, so as to be capable of rotating around the sleeve while compelled to move with it along the shaft S⁶, I attach the middle portion of one end of the plate T³. By this construction the plate T³ is set off from but parallel to fly-plate T, so that as the sleeve is moved along the shaft toward such fly-plate the plate T³ will overlap and slide alongside said fly-plate, so that both plates must rotate together and the retarding surface of the fan is increased by the amount of plate T³ projecting beyond the edge of plate T.

To enable the plate T³ to be moved as desired to regulate the effective area of the fan, a rod, U, is provided, having an arm, $u$, attached to the sleeve, and a suitable handle projecting from the side of the casing, as shown at U'. As this rod is pushed in or pulled out, the retarding power of the fan will obviously be diminished or increased, unless it be pulled out so far that the plate T³ be disengaged from plate T, when the retarding power of the fan will be simply proportional to the area of plate T. This adjustable regulator is of especial advantage for use in connection with the transmitting devices of apparatus, as it enables change in speed of sending, to suit different circumstances and to suit different receivers, to be made readily and quickly. Instead of having plate T³ coextensive with plate T, it may be made smaller or larger, or may consist of a portion on one side of the plate only, instead of projecting equally beyond the shaft on opposite sides thereof.

To start the gearing into operation to revolve the circuit-wheel when a signal or Morse character is to be sent, and to stop it and the wheel as soon as the character has been completed, I provide the following mechanism: To the front of the casing I pivot the outer end of lever V, which extends inward and rearward to the left of the circuit-wheel just above the arms L' L² on the unit-arms L L of the circuit-wheel to the rear side of the wheel, when it bends downward suddenly, and then, curving around concentrically with the circuit-wheel, passes over the tops of the outer ends of bars L L until the bar in position to be operated by the arm on the unit-strip marked 1 is reached. The downwardly-inclined portion at the beginning of the curved part of the lever is so situated that the arms L' L² L' L² on the bars will just clear it as the circuit-wheel revolves. If desired, the lever could of course be carried back so far from the center of the circuit-wheel as to be beyond the upright arms L' L' on the bars L L.

Pivoted in a suitable lug or arm on the back of the casing is the swinging stop W, resting at its forward end upon the curved portion of the lever V, and adapted when lever V is down to project inward and forward into the track of the upright arms L L on the unit-bars of the circuit-wheel in position to engage one of the arms. This stop is so situated that when it is down it will engage and stop one of the arms of the circuit-wheel at such a point that the wheel will always be in position to have its arms properly engaged by the respective arms on the unit-strips. If desired, a spring can be provided to draw the stop downward; but the weight of the stop can be made sufficient for this purpose without the spring. The stop is rigidly attached to its short shaft or pivot-pin V', which is journaled in ears or lugs v v, attached to the casing. To this shaft V' is fastened or attached the lower end of the upright rod V², which enters upward through the top of the casing, and on its upper end is provided with a knob or hammer-head, v', adapted to strike the bell V³ when the rod falls forward as the stop W falls into its normal position to engage and stop one of the arms or pivoted bars of the circuit-wheel. Said rod is also provided with a pin, v², adapted to engage and stop the arm V⁴ on the fly-shaft when the rod falls forward, as described.

A swinging switch, W', of ordinary and well-known construction, is used to short-circuit the apparatus by establishing direct connection between the two binding-posts when it is not desired to use the apparatus.

Figure 7:
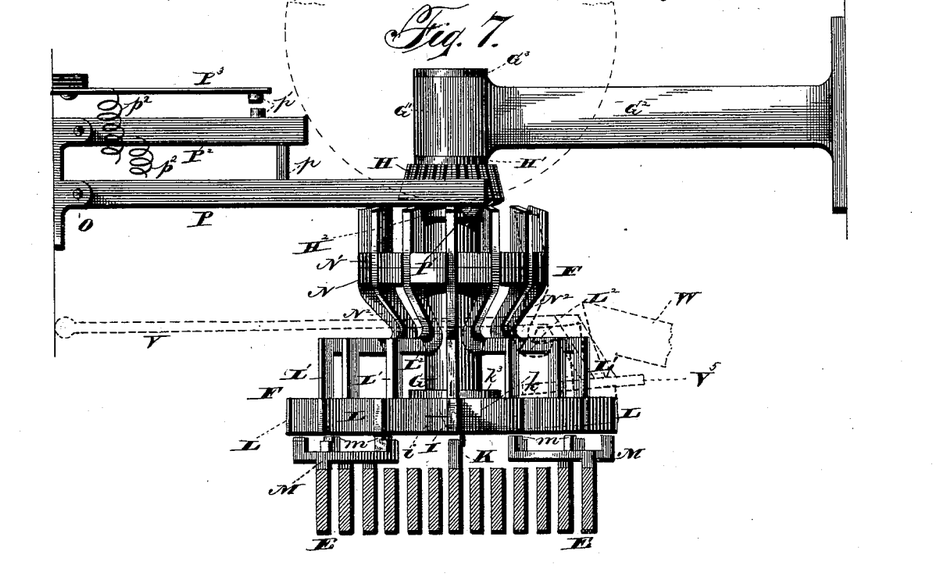
Fig. 7, a detail view, in side elevation, of the circuit-wheel and the devices connected with and carried thereby, and the contact devices, the unit-strips being in section.

The operation of my apparatus is as follows, the spring being wound up and the speed at which the circuit-wheel will be driven by the spring being adjusted by regulating the resistance of the fly, as described hereinbefore: If, for instance, A be the first letter of the message, the A-key is depressed by the finger. This raises the rear or inner end of the lever, so that the projections on the upper edge thereof, corresponding with the Morse sign · —, strike and raise the unit-strips Nos. 1, 3, and 4, as numbered in the drawings—that is, the rear strip, the next but one thereto, and the one next to that. As these strips are so raised, their arms M M M engage the corresponding pivoted bars, L L L, of the circuit-wheel, throwing them up, so that the inturned ends of the upright arms thereon pass above the outer ends of the hooks of the pivoted pawls N² N² N². The hooked lower ends of these pawls then swing outward under the inturned portions of the arms on the bars, so as to retain them in an elevated position. The upper ends of the pawls are by such swinging carried inward, so as to stand nearer the axis of ends of the the circuit-wheel than the corresponding other pawls. Meantime the lug m on each arm M engages the side of its respective unit-bar L, so that the circuit-wheel cannot begin to rotate until the unit-strips fall and disengage the arms M M M from the bars L L L. By the swinging up of these bars on their pivots the outer end of the lever V, which rests on the bars, is thrown up, as shown in dotted lines in Fig. 7, and held up until all the raised bars have passed from under the flat curved portion V⁵ thereof. This raising of the lever causes the stop W to swing up, so as to be out of the track of the upright arms on bars L L L of the circuit-wheel, and also carries the rod V² back, so as to disengage stop-pin v² from the arm V⁴ and the fly-shaft. If the key-lever has been released and allowed to fall to its normal position, the circuit-wheel will immediately commence to revolve. As long as the lever is held with its rear or inner end up by pressure on the key-plate the circuit-wheel will be held from rotation by the lugs or shoulders m m m on the arms M M M, as indicated above, but will begin its rotation immediately upon the releasing of the key-lever and the consequent fall of the unit-strips. As the wheel revolves, the first one of the raised bars L L L passes out from under the curved part V⁵ of the lever V, which is still held by the succeeding raised bars, and the upper end of the corresponding pawl strikes the lug P' on the transmitting-lever P. This raises the lever P, and so the conducting-lever P², until its contact-stud comes in contact with the stud on spring P³. The circuit is thus closed. After the passage of the pawl end below the lug P', the lever P falls quickly, allowing lever P² to drop and break the circuit. As the upper end of the next pawl is not swung in, it passes outside of and does not engage lug P'. The upper end of the third pawl is swung in, and consequently engages the stud, as did the first pawl, and causes the circuit to be closed. The fourth pawl being swung, as described, then comes around in position to engage the lug P', so that the lever P is prevented from falling, so as to cause the circuit to be broken, as it did after the first pawl passed, until the fourth pawl passes out of engagement with the stud—that is, the lever P is held up and contact made and maintained to close the circuit during the time required for the passage of two pawls. The first closing of the circuit was a short one, to send a signal, represented by a dot, and then there was a longer contact and closing of the circuit represented by a dash. As soon as the last-raised bar L has passed from under portion V⁵ of lever V, said lever drops, the stop W falls to engage an arm on one of the bars L L, the stop-pin v² engages the arm on the fly-shaft, and the hammer strikes the bell, indicating that the signal for A is finished. After its upper end has engaged the lug P' and operated lever P, as described, each of the three pawls is engaged below its pivot by the end of arm P⁴, and its hooked lower end is swung inward into its normal position, releasing the arm on bar L and carrying its upper end out into the circle with the upper ends of the other pawls. If the next letter is T, the T-key is depressed and the single-dash projection on its upper edge raises the first and second unit-strips and the first and second bars of the circuit-wheel. The first and second pawls are then swung to bring their upper ends into position to engage the lug P' on lever P. When the wheel revolves, the lever will then be thrown up and kept up to close the circuit during the passage of the two pawls, thus sending a dash-signal, which is the Morse character for T. A space in a signal would, of course, be made by leaving two successive pawls in their normal positions, so that their upper ends will not be in position to engage the lug P' as the circuit-wheel revolves. The transmitting-lever would then remain down until both these pawls had passed and one, with its upper end swung in, reached the lug P'. As the unit-strips as arranged rise and fall freely and easily, they aid by their weights to return the key-levers to their normal downward positions very quickly as soon as pressure on the key-plates is taken off.

With my apparatus, as described, the signal for any desired letter will be transmitted automatically upon pressing the proper key, so that any one can send a telegraphic message without any necessity of knowing or learning the different signals for the letters. By my apparatus, then, the necessity for trained and skilled telegraph-operators is entirely done away with.

The signals are all sent at the same rate, which can be varied as desired by means of the regulating device described. The stroke on the bell will always be given when any one character or signal is completed, so that there is no chance of confusion of signals. As soon as the bell is struck another key can be pressed to send the signal for another letter.

I have described and shown my apparatus as adapted to transmit the Morse signals or characters; but it is obviously applicable to the transmitting of signals or characters according to other codes, or can be adapted to transmit them without such change as would involve departure from my invention.

Having thus described my invention, what I claim is—

1. In a telegraphic transmitter, in combination with the series of movable strips, the series of key-levers below the same, each provided with one or more lugs adapted to engage and lift one or more of the strips as the lever is operated, substantially as and for the purpose described.

2. In a telegraphic transmitter, the series of key-levers, each of which is provided on its upper edge with one or more projections corresponding in extent and relative arrangement with the telegraphic character or signal for a letter, sign, or number of a telegraphic code, and the series of movable strips above such levers and at right angles thereto, substantially as and for the purpose described.

3. In a telegraphic transmitter, in combination with the series of parallel movable strips, the series of key-levers below the same, each provided on its upper edge with an arrangement of dot and dash projections corresponding with the arrangement of dots and dashes constituting the telegraphic signal or character for the letter, sign, or number of the key-lever, each dot projection being adapted to engage one of the strips and the dash projection two or more, according to the length of the dash in the character, substantially as and for the purpose described.

4. In combination with the contact devices, the rotary wheel provided with movable pieces normally out of position to operate the contact devices as the wheel revolves, and means for moving and holding one or more of such pieces in position to operate the contact devices as the wheel revolves, substantially as and for the purpose described.

5. In combination with mechanism for making and breaking circuit, the rotary circuit-wheel provided with pivoted arms normally out of position to operate the make-and-break mechanism, and means for moving and holding one or more of such arms in position to operate such mechanism to close the circuit, substantially as and for the purpose described.

6. In combination with the transmitting-lever provided with a stud, the rotary circuit-wheel carrying a series of pivoted pieces normally in position, so as to avoid the stud on the lever as the wheel rotates, and means, substantially as described, for moving one or more of these arms into position to engage the stud on the transmitting-lever as the wheel revolves, substantially as and for the purpose described.

7. In combination with the circuit-wheel rotating in one direction, a key-lever, and suitable mechanism for rotating the wheel, means for starting the mechanism into action to rotate the wheel after the key-lever has been moved and released, and for stopping such mechanism as soon as the character or signal is finished independently of the complete rotation of the wheel, substantially as and and for the purpose described.

8. In a telegraphic transmitter, in combination with the rotary circuit-wheel and mechanism tending to normally revolve it, means for releasing the mechanism and allowing the wheel to revolve and send a signal when a key has been depressed and released, and automatic means for stopping the driving mechanism and the wheel and striking an alarm when the character or signal is finished without reference to the completion of a rotation by the wheel, substantially as and for the purpose described.

9. In combination with the radial pivoted bars on the circuit-wheel, the series of movable strips below the wheel, each having an arm or lug adapted to engage and lift one of the bars when the strip is raised, substantially as and for the purpose described.

10. In combination with the pivoted radial bars on the rotary circuit-wheel, the movable strips below the wheel, each provided with an arm adapted to engage one of such bars when the strip is raised, and having a lug or shoulder adapted to engage the side of the bar and prevent its movement until the strip falls again, substantially as and for the purpose described.

11. The rotary circuit-wheel provided with the radial bars L L, pivoted thereto, each having on its upper side an upright arm turned in at its upper end toward the axis of the wheel, and the hook arms or pawls $N^2 N^2$, pivoted so as to swing in radial planes, and at their lower hooked ends engaging the ends of the inturned portions of the arms or bars L L, when such bars are down in their normal horizontal position, substantially as and for the purpose described.

12. The circuit-wheel having the upper and lower heads, the radial bars pivoted to the lower head, provided with upright arms having their upper portions turned inward, and the upright bars pivoted to the upper head, having their lower ends hooked and adapted to engage the inner ends of the inturned portions of the arms on the radial bars, when such bars are in horizontal positions, substantially as and for the purpose described.

13. In combination with the series of hooked arms pivoted to a head or flange of the circuit-wheel, so that their lower hooked ends tend to normally swing outward, the series of radial bars pivoted to a second head or flange of the wheel, having inturned hooked projections adapted, when the bars are down in horizontal position, to engage the hooked ends of the pivoted hooked arms to hold them normally swung inward until the bars are raised, substantially as and for the purpose described.

14. In combination with the rotary circuit-wheel having the series of pivoted hook-arms having their lower ends hooked and so pivoted that they tend to swing such lower ends outward, and the pivoted radial bars having hooked uprights adapted to engage the hooks on the pivoted hook-arms and hold them swung inward while the radial bars are down, but to rise above such hooks when the radial bars are raised, so as to let the hook-arms swing outward, the transmitting-lever, and a stud situated inside of the circle of travel of the upper ends of the pivoted hook-arms when the lower hooked ends thereof are held in, substantially as and for the purpose described.

15. In combination with the rotary circuit-wheel having the series of pivoted hooked arms $N^2$ $N^2$ and the series of pivoted radial bars L L, provided with the hooked uprights normally engaging the ends of the hooks of the pivoted hooked arms, the transmitting-lever for operating the contact devices, having the stud so situated as to be engaged and thrown up by the upper ends of the pivoted hook-arms only when such ends have been swung inward from their normal position, substantially as and for the purpose described.

16. In combination with the pivoted radial bars of the rotary circuit-wheel and means for raising one or more of these bars as desired, the stopping and starting lever V, resting upon several of the bars, so as to be raised by the bars as they are raised, and the stop-lever adapted to be moved by the stopping and starting lever to release the circuit-wheel-driving mechanism when the latter lever is raised, substantially as and for the purpose described.

17. In combination with the pivoted radial bars of the circuit-wheel, the stopping and starting lever having a portion resting upon one or more of the bars, and the pivoted stop-arm resting upon the lever adapted to engage a portion of one of the bars when the bars and lever are down, substantially as and for the purpose described.

18. In combination with the pivoted bars L L of the circuit-wheel, the lever adapted to be raised as one or more of the bars are lifted, and a stop adapted to normally engage one of the bars and to be raised to release the bar when the lever is raised, substantially as and for the purpose described.

19. In combination with the circuit-wheel provided with the pivoted bars L L and means for rotating the wheel, the stopping and starting lever adapted to be raised by the swinging up of one or more of the bars, and means for stopping the driving mechanism when the lever is down and releasing it when the lever is up, substantially as and for the purpose described.

20. In combination with the rotary circuit-wheel and the pivoted bars L L thereof, spring mechanism for driving the wheel, an arm on the fly-shaft, a lever engaging one or more of the bars, adapted to be raised by the raising of one or more of such bars, the pivoted arm resting on such lever, and the rod connected therewith, having a pin or arm adapted to engage the arm on the fly-shaft when the pivoted arm resting on the lever is down, a bell, and a hammer on the rod adapted to strike the bell as the rod swings into position to stop the fly-shaft, substantially as and for the purpose described.

21. In combination with the rotary circuit-wheel and mechanism for rotating the same, the lever adapted to be raised by the raising of one or more of the pivoted radial bars of the circuit-wheel, the pivoted stop-arm resting on such lever, and when the lever is down adapted to engage an arm or projection on one of the bars of the wheel, the rod connected and swinging with such pivoted stop-arm, the bell, and the head or hammer on the rod adapted to strike the bell whenever the lever and stop-arm drop again into their lowest positions after being raised, substantially as and for the purpose described.

22. In combination with the series of movable strips E E, having the upwardly-extending arms at their ends, the stationary guiding lugs or ears between the arms of contiguous strips, and the anti-friction rollers engaging the outer sides of the arms, substantially as and for the purpose described.

23. In combination with the pivoted hook arms or pawls of the circuit-wheel, and the transmitting-lever having a stud or lug so situated as to be engaged by the upper ends of such of the pawls as are swung to bring their upper ends inward, means, substantially as described, for swinging such pawls to move their upper ends outward again after they have engaged the stud on the lever, substantially as and for the purpose described.

24. In combination with the pivoted hook or pawl arms on the rotary circuit-wheel, the transmitting-lever having a lug adapted to be engaged by the upper ends of such of the hook arms or pawls as may be swung to bring their upper ends inward beyond the rest, and the trip-arm adapted to engage the lower portions of the pawls or arms and swing them inward after their upper ends have engaged the stud on the lever, substantially as and for the purpose described.

25. In combination with the rotary circuit-wheel and the pivoted radial bars provided with hooked arms, and the pivoted hooked arms or pawls carried by said wheel, the transmitting-lever having the lug adapted to be engaged by the upper end of any pawl which is swung to bring its upper end inward beyond the others, and the trip adapted to engage such pawl below its pivot to swing its lower end inward again on a line with the other pawls after its upper end has engaged the stud on the lever, substantially as and for the purpose described.

26. In a telegraphic transmitter, in combination with the transmitting devices and the driving mechanism therefor, the fly or fan shaft, and the means for increasing or diminishing the effective area of the fan, which consists in the plate engaging and rotating with the fan and adapted to be slid along the shaft, so as to leave more or less of the plate extending beyond the end of the fan, substantially as and for the purpose described.

27. In a telegraphic transmitter, in combination with the transmitting devices and the driving mechanism therefor, the fly or regulating fan, and the plate engaging and rotating with the fan, pivotally supported on a sliding sleeve on the fly-shaft, substantially as and for the purpose described.

28. In a telegraphic transmitter, in combination with the mechanism for driving the transmitting devices, the fan-shaft and the fixed fan thereon, the sliding sleeve on the shaft, the rod connected with the sleeve, whereby said sleeve can be slid on the shaft toward or from the fan, and the plate connected with the sleeve so that it can rotate but must move with it along the shaft, all substantially as shown and described, so that the speed of the transmitting devices can be regulated at will by moving the rod connected with the sleeve.

In testimony that I claim the foregoing I have hereunto set my hand this 20th day of July, 1885.

ZEROY P. HOTCHKISS.

Witnesses:
HORACE P. HOTCHKISS,
FRANK W. SHERMAN.